2,771,500

STORAGE BATTERY PLATE

Howard J. Strauss, Philadelphia, and Harold C. Riggs, Langhorne Manor, Pa., assignors to The Electric Storage Battery Company, a corporation of New Jersey No Drawing. Application December 29, 1951, Serial No. 264,281

1 Claim. (Cl. 136—30)

This invention relates to secondary or storage batteries, particularly to the plates thereof and has for an object the provision on the plates of a sheath or coating which increases the life of the battery without adversely affecting any electrical property thereof.

Though applicable to cells and batteries of other types, the present invention has been found to be particularly useful in connection with silver-zinc-alkaline storage batteries in which shortened battery life is at least in part due to the failure of the diaphragms or separators to isolate plates of one polarity from those of the opposite polarity except for the ionic flow of current therebetween. In the charging of such a battery, the metallic silver of the positive plate is gradually converted until when completely charged, the positive active material consists of a mixture of silver oxide and silver peroxide, a mixture that is strongly oxidizing in character.

In batteries of the foregoing type the diaphragm or separator has been made of regenerated cellulose, such as cellophane or fibrous sausage casing, such diaphragms or separators being susceptible to attack and destruction by oxidation. A small amount of the positive active material will become migratory within the cell by dissolving in the electrolyte as complex ions or argentates, or by being colloidally dispersed in the electrolyte. These particles or ions then come into contact with the diaphragm or separator and oxidize it while they themselves are being reduced. The destruction of the separator or diaphragm by oxidation may also be accelerated by actual flaking off of silver particles from the positive plate. In either case, the particles lodging between the diaphragm and the positive plate or on the diaphragm form an extension of the electrode surface toward and into contact with the diaphragm. So long as they are in electrical contact with the positive plate they undergo the same chemical changes as the positive active material, that is to say, upon each recharge of the cell they are reconverted to silver oxide or silver peroxide and will then oxidize an additional portion of the diaphragm. As more particles are dislodged, the area of the diaphragm in direct physical contact with the mixture of silver oxide and silver peroxide is increased, and, therefore the destructive oxidation of the diaphragm proceeds at an ever increasing rate. Unregenerated cellulose interposed between the diaphragm and the positive plate, as in the form of porous paper slightly increases the internal resistance and is itself subject to attack by oxidation. The effect in general of the addition of the porous paper is the provision of a greater amount of material to be oxidized rather than offering a solution to the oxidizing problem itself.

In accordance with the present invention, it has been found that if the positive plate be enclosed by a protecting sheath or coating which is inert to the oxides and also of good non-conducting material, any silver particles separating from the positive plate are insulated or removed from electrically conductive contact with the positive plate and, therefore, will no longer be changed in chemical composition during charging and discharging of the battery. The protecting sheath or coating should not be of a material that itself has chemical reducing properties; i. e., is subject to chemical change by oxidation. The sheath must be inert to the strong alkaline electrolyte and it should not materially increase the internal resistance of the cell. Furthermore, the sheath should preferably be of low cost and its manner of application to each plate should lend itself to production methods with good reproducibility as regards thickness and performance.

In a preferred form of the invention, a battery electrode or plate is provided with the protective sheath or coating by dipping the plate into a suspension of magnesium hydroxide (milk of magnesia). On air drying, the magnesium hydroxide which uniformly coats the surface of the plate is converted to a porous coating of magnesium oxide and magnesium carbonate. It has been found that if the plate first be dried, the simple dipping operation followed by air drying results in a sheath which is relatively strong, and uniform in thickness throughout the surface of the plate. It meets all of the necessary requirements above specified. Where the thickness of the coating is to be increased, after the first coat has been dried and "set" by chemical change, the plate or plates may be again dipped to build up the thickness and dried, and the process be repeated to attain the desired thickness. The sheath, after a single dip in the mangesia and after the setting thereof, appears to have a thickness of from two-thousandths to three-thousandths of an inch. It affects but little the internal resistance of the cell yet provides current interruption as between any particles of silver leaving the surface area of the plate and hence, to a surprising degree, protects the diaphragm from destruction by oxidation.

The degree of improvement is indicated by an increased cell or battery life of the order of one hundred percent of like cells or batteries that do not include the protective sheath of the present invention. In tests carried out on single-cell storage batteries of the same silver-zinc-alkaline type, in the absence of the present invention there was attained a cycle life of from eight to ten cycles before cells became unsuitable for continued use. The test conditions were as follows: The cell was charged at a constant current of five amperes to a total input of thirteen ampere hours (time required about 2.6 hours). After a rest period of from one to two hours following charge, each cell was discharged at the rate of 120 amperes for five minutes. If at the end of that time the battery voltage was one volt or over, the cell was considered suitable for the next cycle of the test. The foregoing procedure was continued for each cell until the battery voltage decreased below one volt at the end of five minutes at which time the cell was considered unsuitable for further service. Cells, not including the present invention and tested as above, gave a cycle life of the above indicated eight to ten cycles. Utilizing the same test procedure, cells having protective coatings on the plates as described above gave cycle lives of from sixteen to twenty cycles, although in some instances as high as twenty-five cycles were obtained, with most cells giving eighteen cycles. As a result of the present invention, the cycle life of the battery has been greatly increased, in most cases more than doubled.

Magnesium hydroxide is the preferred material of which the sheath is made not only because it meets all of the requirements outlined above but also for the reason that it is readily available at low cost as an emulsion in the form of milk of magnesia. Other materials having like properties, such for example as chromium hydroxide, can be used in place of the milk of magnesia or magnesium hydroxide. Nickel hydroxide may also be used in place of the magnesium hydroxide or any metal hydroxide which, upon air drying or its equivalent, will change to a metal oxide and/or a metal carbonate, each of which is inert to the alkaline electrolyte, and each of which is non-conductive to provide the requisite current-interrupting capability.

Where the thickness of the sheath is to be somewhat less than about two-thousandths of an inch, the plate can be dampened with water. The wetter the plate, the thinner will be the sheath finally formed thereon by a single dipping operation. To control wetness the plates are immersed in water and then dried to a predetermined moisture content. Accurate control of the amount of magnesia which will adhere to the plates with each dipping operation is thereby achieved.

Air drying of each coat is preferred since it is necessary not only to remove the moisture from the magnesium hydroxide on the plate but also to provide conditions for conversion of the magnesium hydroxide to magnesium oxide and, by reason of absorption of carbon dioxide from the air, the conversion of a part of the magnesium hydroxide to magnesium carbonate. The magnesium carbonate appears highly desirable for the reason that it imparts a greater toughness to the coating of the sheath.

After repeated charging and discharging of the battery to the end of the useful life thereof, it has been found that the sheath or coating is relatively free of silver and is still strongly mechanically bonded to the plate.

It will be understood that the above described sheath is also useful when applied to the negative plate. In this situation, the function of the sheath is to provide mechanical support for the negative material, a function admirably carried out by reason of its inherent mechanical toughness and the bond formed between the sheath and the active material.

In copending application Serial No. 263,999, filed October 26, 1954, now Patent No. 2,692,904, filed concurrently herewith there is disclosed a battery of increased cycle life attained by mixing a high molecular weight colloid dispersible in strong alkali electrolytes within the active material of negative electrodes. Further in accordance with the present invention, the sheath or coating is applied to each positive plate and such a colloid in amount not above about two percent by weight of the active material (zinc oxide) of each negative plate is thoroughly mixed therewith. Such a colloid may consist of one or more of the following: gum arabic, gum tragacanth, gum karaya, starch, licorice, lignin, and glues of animal origin. The presence of the colloid inhibits the crystalline growth of metallic zinc and prevents protuberances from puncturing or rupturing the diaphragm. Gum arabic and starch are preferred as the colloidal material with some preference being for the former.

What is claimed is:

In a silver oxide-zinc battery containing an alkaline electrolyte, the improvement consisting of a positive plate characterized by an enclosing sheath consisting of magnesium oxide and magnesium carbonate, said sheath being sufficiently porous to permit the passage of electrolyte therethrough, and said sheath having been produced by dipping said plate in an aqueous suspension of magnesium hydroxide, and air drying the plate so dipped.

References Cited in the file of this patent

UNITED STATES PATENTS

| | | |
|---|---|---|
| 396,369 | Roberts | Jan. 15, 1889 |
| 623,195 | Werner | Apr. 18, 1899 |
| 668,356 | Placet | Feb. 19, 1901 |
| 1,505,990 | Willard | Aug. 26, 1924 |
| 1,710,617 | Haddon | Apr. 23, 1929 |
| 2,014,390 | Lunn | Sept. 17, 1935 |
| 2,594,711 | Andre | Apr. 29, 1952 |

FOREIGN PATENTS

| | | |
|---|---|---|
| 602,704 | Great Britain | June 1, 1948 |